Patented Aug. 20, 1940

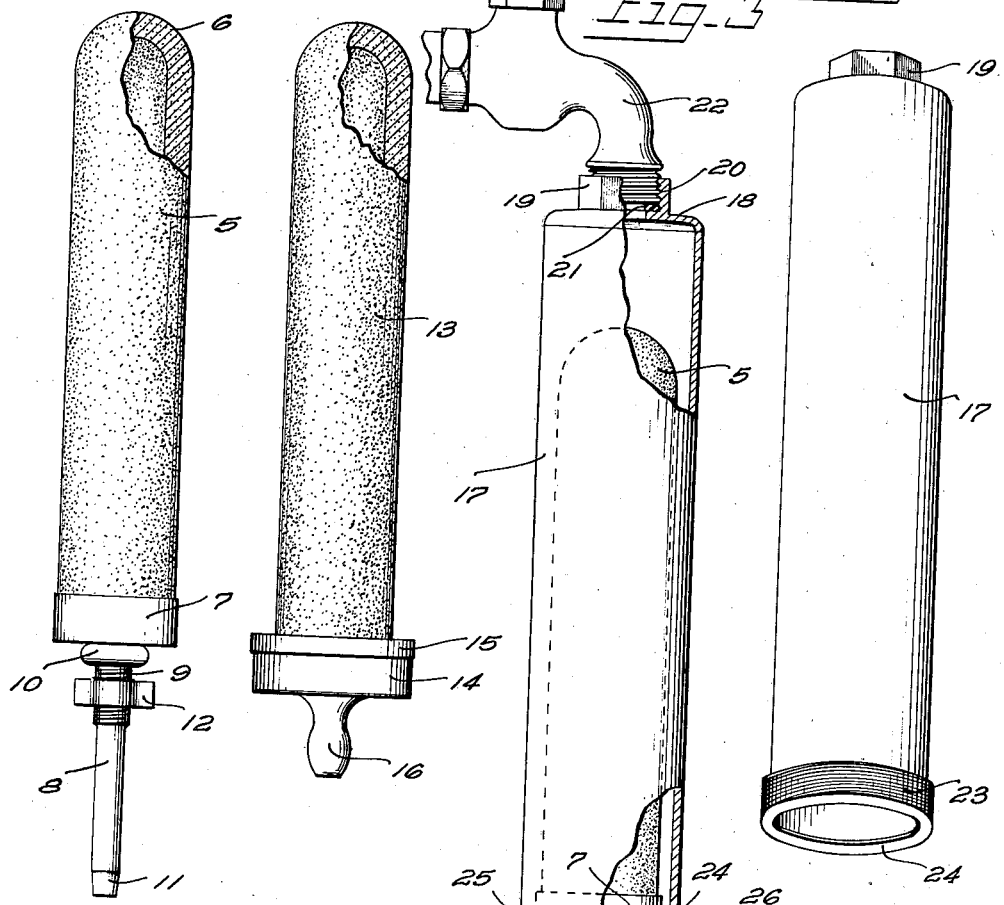

2,211,892

UNITED STATES PATENT OFFICE 2,211,892

MEANS FOR FLUSHING FILTER TUBES

Otto E. Giese, New York, N. Y.

Application July 1, 1938, Serial No. 217,081

3 Claims. (Cl. 141—1)

The invention relates generally to filtering apparatus of the type employed in the manufacture of antitoxins, and primarily seeks to provide novel means for flushing and cleansing the filter tube elements forming parts of such apparatus prior to putting them into use for the purpose specified.

In the manufacturing of antitoxins or like medicinal preparations, the liquid or liquids to be filtered are passed through tubes of earthenware, porcelain or similar porous materials in order to filter out from the liquids to be ultimately collected, all undesirable substances. The filter tubes, which are open at one end and closed at the opposite end, being formed of the porous materials stated and when put into service new, are likely to include loose earthy or mineral substances, such as infusoria or cement dust, which should be removed before the tubes are put into use so that no traces of these adherences will appear in the filtrate.

The invention therefore has for an object to provide a simple container or casing in which the filter tubes can be mounted and subjected to a flushing or washing liquid treatment serving effectively to remove from the filter tubes adherences such as infusoria dust, cement dust or the like.

Another object of the invention is to provide a novel means for supporting and mounting a filter tube in a manner for facilitating flushing thereof.

Another object of the invention is to provide a flushing cylinder of the character stated having provision for mounting the filter tube in spaced relation therein, and for attachment directly to a water faucet so that water at normal service pressure can be used as the flushing agent.

Another object of the invention is to provide a novel filter flushing cylinder of the character stated in which provision is made for the mounting of tubes differing in form.

With the above and other objects in view which will more fully appear, the nature of the invention will be more clearly understood by following the description, the appended claims, and the several views illustrated in the accompanying drawing.

In the drawing:

Figure 1 is a side elevation of one form of filter tube, parts being broken away and in section.

Figure 2 is a side elevation of another form of filter tube, parts being broken away and in section.

Figure 3 is a side elevation illustrating the complete apparatus attached to a faucet, parts being broken away and in section, and a filter tube of the type shown in Figure 1 being shown.

Figure 4 is a fragmentary vertical section illustrating the mounting of the base portion of a tube of the type shown in Fig. 2.

Figure 5 is a detail perspective view of the casing or cylinder per se.

Figures 6 and 7 are detail perspective views illustrating the selective tube mounting caps.

In Figure 1 of the drawing there is illustrated one form of filter tube adapted to be flushed or cleansed in the improved apparatus disclosed herein. This tube is in the nature of a hollow cylindrical shell 5 formed of earthenware, porcelain, or some other porous material and closed at one end as indicated at 6. The other end of the tube is open and is cemented or otherwise secured in a metal cup or cap 7 including a depending stem 8. The stem 8 includes an externally threaded portion 9, surrounded by a ring gasket 10, and a tapered end portion 11 adapted to be received in the usual tube or cork structure by which attachment is made to the apparatus employed in manufacturing antitoxins or other similar material to be filtered through the tube. A nut or clamping element 12 is adjustably mounted on the threaded portion 9 for a purpose that will later become apparent.

In Figure 2 of the drawing there is illustrated another form of filtering tube which includes a body portion 13 which may be identical in structure and purpose with the tube previously described, and to the open end of which a porcelain cap 14 is suitably secured. The porcelain cap, which is larger in diameter than the metal cap hereinbefore described, thereby forming an upper clamping flange portion opposed by a sealing gasket 15, includes a depending nipple portion 16 which serves the same purpose as is served by the metal stem 8 of the filter tube unit hereinbefore described.

When the improved apparatus is used for flushing or cleansing the filter tube units, such units are mounted in the manner generally illustrated in Figure 3 of the drawing in a cylindrical shell or casing 17 preferably of brass and provided at its upper end with a restricted portion 18 including a non-circular extension or nut 19 centrally apertured and having a threaded counterbore 20 providing a seat for receiving a washer or gasket 21. While a hose line or any suitable flushing or washing fluid source connection may be made with the nut 19, it is preferred that connection be made directly with a standard faucet 22, as illustrated in Figure 3 of the drawing. The shell 17 is externally threaded at its lower end as at 23 and provided with an inwardly turned seat flange portion 24.

The shell 17 is standardized so as to properly mount filter tubes of different forms such as are shown in Figures 1 and 2 of the drawing. In order to suitably secure the different forms of filter tubes in position in the shell 17, selective mounting caps are provided such as are disclosed in detail in Figures 6 and 7 of the drawing. In Figure 3 of the drawing the filter tube of the form shown in Figure 1 is mounted in the shell, and in Figure 4 the mounting of a tube of the form shown in Figure 2 is illustrated. The selective mounting cap shown in Figures 3 and 6 of the drawing and designated 25, includes knob extension or handle portions 26 and is internally threaded as at 27 so that it can be readily mounted on and removed from the externally threaded portion 23 of the shell 17. This particular cap includes a clamp flange portion 28 having a central aperture 29 of small diameter for permitting projection therethrough of the depending stem 8 of the tube unit. When this form of cap is employed for mounting the tube of Figure 1, a gasket 30 is inserted in the cap for engaging between the cap and the seating flange portion 24 of the shell. It will be noted also that the ring gasket 10 is interposed between the clamp flange portion 28 of the cap and the end cup or cap 7 of the tube unit. By threading the cap 25 onto the shell 17 the gasket 30 will be compressed to form a perfect seal, and by applying and tightening the nut 12 the ring gasket 10 will be compressed to form a seal and to secure the filter tube unit to the cap 25 in spaced relation to the shell walls as illustrated in Figure 3 of the drawing.

When the filter tube of the form shown in Figure 2 is to be mounted, the cap illustrated in detail in Figure 7 of the drawing is applied in the manner illustrated in Figure 4. This cap, designated 31, includes knobs or handle portions 32 and is internally threaded as at 33 for threadable engagement with the externally threaded portion 23 of the shell 17. Like the other cap, this cap includes a clamp flange portion 34 and a central aperture 35, but the aperture 35 is considerably larger than the aperture in the other cap so as to accommodate the larger portion of the nipple 16, as shown in Figure 4. In this form of mounting, as the cap 31 is screwed home on the end of the shell 17 the gasket 15 surrounding the tube 13 above the porcelain cap 14 is compressed against the seat flange 24 of the shell to form a liquid seal.

It is of course to be understood that the details of structure and arrangement of parts may be variously changed and modified without departing from the spirit and scope of my invention.

I claim:

1. A filter tube flushing device comprising a cylindrical shell having a threaded open end and an end closed except for a flushing water receiving aperture, means at the position of the aperture for enabling direct threadable connection with a standard faucet, and means at the open end of the shell supporting a filter tube to be flushed in said shell in spaced relation with the walls thereof whereby water entering the shell from the faucet will be caused to pass through the walls of the tube, said supporting means being threadably mountable and removable at said open end whereby said supporting means can be readily removed and the filter tube withdrawn through said open end.

2. In a filter tube flushing apparatus, a cylindrical shell having a threaded open end and an apertured closed end having provision for direct connection with a faucet, a filter tube to be flushed comprising a porous cylindrical shell closed at one end and having an apertured mounting cap secured on its other end, a mounting cap for holding the tube in spaced relation within the shell walls and threadably secured on the threaded end of the shell, sealing means compressed by the threadably secured mounting cap for sealing the shell against egress of water except through the walls of the tube, and means for securing the tube to the threadably secured mounting cap for movement therewith, so that the filter tube and the mounting cap are mountable and removable as a unit.

3. In a filter tube flushing apparatus, a cylindrical shell having a threaded open end including a clamp flange portion and an apertured closed end having provision for direct connection with a faucet, a filter tube to be flushed comprising a porous cylindrical shell closed at one end and having an apertured mounting cap secured on its other end, a mounting cap for holding the tube in spaced relation within the shell walls and threadably secured on the threaded end of the shell, a sealing gasket compressed between the threadably secured mounting cap and the clamp flange portion, said threadably secured cap having a central aperture therein, said tube carried mounting cap including an externally threaded hollow stem depending therefrom, a gasket surrounding the stem between the mounting caps, and a nut on said stem for securing the caps together and compressing the gasket therebetween, whereby to prevent leakage about said stem and render said filter tube and said mounting cap mountable and removable as a unit.

OTTO E. GIESE.